May 16, 1967  R. D. HAWKINS ET AL  3,320,617

METHOD OF MAKING FREQUENCY RESPONSIVE APPARATUS

Filed May 19, 1964  2 Sheets-Sheet 1

INVENTORS
ROBERT D. HAWKINS
LEO S. BALANDIS
BY
*J. H. Terry*
ATTORNEY

United States Patent Office 3,320,617
Patented May 16, 1967

3,320,617
METHOD OF MAKING FREQUENCY RESPONSIVE APPARATUS
Robert D. Hawkins, Greenlawn, and Leo S. Balandis, Valley Stream, N.Y., assignors to Sperry Rand Corporation, Great Neck, N.Y., a corporation of Delaware
Filed May 19, 1964, Ser. No. 368,542
8 Claims. (Cl. 346—1)

The invention relates to signal-responsive apparatus, and in particular to apparatus responsive to the various frequency components of oscillatory signals, for example, in the audio-frequency range.

According to the present invention, apparatus responsive to an oscillatory signal comprises one or more radiation-transmissive elastic elements which may be in the form of rods or fibers rigidly supported in a mounting so that at least one end or set of ends is or are free to vibrate, means for supporting a mask close to the said free end or set of ends, and a photocell positioned so that in use it receives the radiation transmitted by the fiber or fibers and the mask.

Preferably, there are a very large number of fibers, for example, several hundreds, or, in some cases, several thousands or even more. The fibers may be small and may consist of lengths of optical grade #1 fused quartz arranged to have different resonant frequencies of vibration.

A light source may be arranged to illuminate the end faces of the fibers furthest from the photocell, and an electro-mechanical transducer may be positioned so as to act on the fibers to set them in vibration in response to an electrical input signal.

In use of the apparatus, with a signal supplied to the transducer those fibers whose resonant frequency approximates the frequency of a component of the applied signal are set into vibration and their free ends move in relation to the mask. If the mask is prepared with a suitable pattern of light and dark areas as described below, the radiation reaching the photocell will depend on the frequency spectrum of the signal and by the use of a suitably prepared mask the device may be cause to recognize, and indicate by producing an appropriate output signal from the photocell, a signal having the particular frequency spectrum for which the mask was prepared. The mask may be considered the adaptive memory of the present invention.

A frequency spectrum analyzer of this kind requires a large number of fibers. A device with a single fiber will respond to only one, or to a limited number, of frequencies, but by a suitable mask may be caused to produce an output signal differing from, but related to, the input signal.

A method of preparing a mask for use with apparatus of the above kind, and particularly suitable for apparatus having a large number of fibers, includes the steps of inserting a radiation sensitized plate in the mask supporting means, exposing it to radiation emerging from the free ends of the fibers and subsequently processing it to yield either a positive or a negative photographic image or combinations of both. Masks of different kinds are produced according to whether or not a signal is applied to the instrument during the exposure, and according to whether the plate is processed to give a positive or a negative image, or according to the kind of radiation used for the exposure, and according to the condition of the radiation sensitive material before exposing it to the radiation emerging from the fibers. Images of different kinds can be combined in different ways to give a composite mask. For example, the images could be superimposed on several layers, or combined in a complementary fashion in the same layer.

If the fibers are caused to oscillate by the application of a signal during the exposure and the plate is developed to produce a negative image, the image so produced will obstruct the passage of radiation when a signal of similar amplitude and frequency spectrum is applied to the apparatus during use, but will permit radiation to pass in increasing quantity as the signal differs from that with which the mask was prepared. If, on the other hand, a mask is prepared while the fibers are caused to oscillate by the application of a signal, but is processed to produce a positive image, the output from the photocell will be a maximum in use when the signal applied corresponds to that with which the mask was prepared (and also when no signal is applied).

If a negative mask is prepared without any signal being applied to cause the fibers to oscillate, this will obstruct the passage of light when no signal is being received and permit light to pass to the photocell to produce an output when the apparatus is receiving a signal. Such a mask may be combined with a positive mask prepared as described above to produce a composite mask which will give a zero output signal when no input signal is received, and a maximum output for a signal corresponding to that used for the preparation of the mask and also for a signal having additional spectral components.

As described in said patent application S.N. 284,712, one of the types of masks includes an acceptance mask which obstructs light in the complete absence of a signal and provides a maximum output when the input corresponds to that with which the mask was prepared (and also for a signal having additional spectral components) and a lesser signal for inputs of any other kind.

The essential problem in making an acceptance mask is to provide (a) transparent areas where the fibers have moved in response to a signal, (b) opaque spots corresponding to the static position of the fibers in exact registry with the transparent areas, and (c) all other portions of the mask opaque. This may be accomplished by superposition methods, involving either a composite of separately made masks, or a multi-layer film such as color film. Such methods have disadvantages in difficulty of alignment, lack of contrast, complexity of manufacture, and degradation of the optical image in passing through alternate layers. Further, darkroom conditions may be required in their manufacture.

A method that is particularly well suited to making acceptance masks of the type described utilizes a characteristic of certain radiation sensitive materials which will produce a positive image under one set of conditions, a negative image under another set of conditions, and do so reversibly. For instance, Kodak Autopositive plate has the characteristic of being all black if developed without exposure. However, it can be turned latently transparent by long wave radiation outside the spectral sensitivity of the emulsion, and back to black by radiation within the spectral sensitivity of the emulsion, all before development.

The invention further includes utilizing a plurality of cooperative masks disposed between a plurality of fibers and photocells to produce a plurality of signals which are compared to provide a resultant signal considerably more determinative of the desired signal than if only one mask was used.

It is therefore an object of the present invention to provide a frequency responsive system which discriminates accurately to provide an output representative of a desired signal.

It is an additional object of the present invention to provide a frequency responsive system utilizing a plurality of cooperative masks to provide an output accurately representative of a desired signal.

It is a further object of the present invention to provide masks which permit accurate discernment of desired signals.

It is another object of the present invention to provide methods of manufacturing masks which accurately distinguish signals and are adapted for use in frequency responsive systems of the character described.

It is another object of the present invention to provide an acceptance mask on a single layer film, thus minimizing degradation of optical images transmitted through the mask.

It is an additional object of the present invention to provide perfect registry of static and dynamic fiber patterns on the mask.

It is a further object of the present invention to provide a process of making such a mask without removal of the mask from the array, except for final development.

It is another object of the present invention to allow manufacture of an acceptance mask under subdued room light rather than darkroom conditions.

Referring to the drawings.

Figure 1:
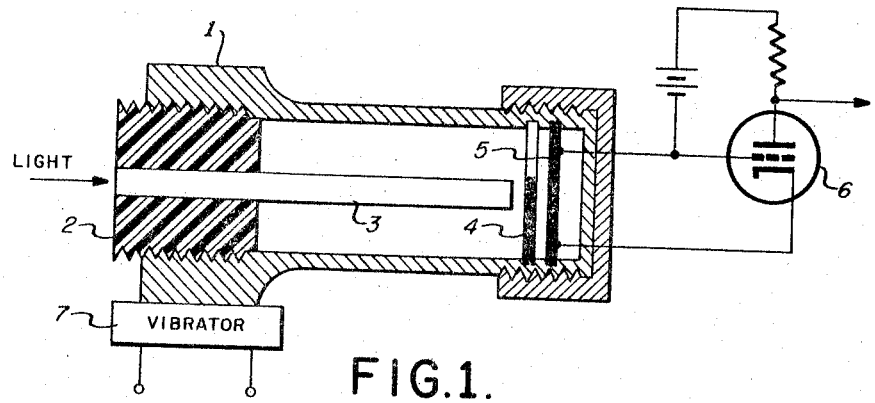
FIG. 1 is a simplified schematic diagram of the basic form of a device according to the present invention.

Referring first to FIG. 1, the apparatus consists of a housing 1 into one end of which is secured a block 2 forming a rigid mounting for an end of a vitreous silica fiber 3. Within the housing 1 is a mask 4 which is partly clear and partly opaque, behind which is a photo-conductive cell 5. This cell is included in a signal-detecting circuit, for example, the grid circuit of a triode 6. Light is arranged to fall on the outer end of the fiber 3. A vibrator 7, for example, a plate of piezo-electric crystalline material provided with electrodes, is attached to the housing 1 so as to cause the mounting 2 to vibrate when an oscillatory voltage is applied to its electrodes.

The operation of the device of FIG. 1 with various kinds of masks is fully explained in U.S. patent application S.N. 185,064 filed Apr. 4, 1962, now Patent No. 3,213,197. For example, assuming a sinusoidal signal applied to the vibrator 7 at the resonant frequency of the fiber 3, the displacement of the free end of the fiber 3 is then also sinusoidal and of the same frequency. The frequency, for example, may be in the audio range. The thickness of the fiber 3 and its spacing from the mask 16 are greatly exaggerated for ease of illustration. When using a mask 16 of the configuration shown in FIG. 1, light falls on the photocell 5 when the fiber 3 bends upwardly to provide substantially a clipped half wave rectified output signal from the triode 6, i.e., a square wave.

Figure 2:
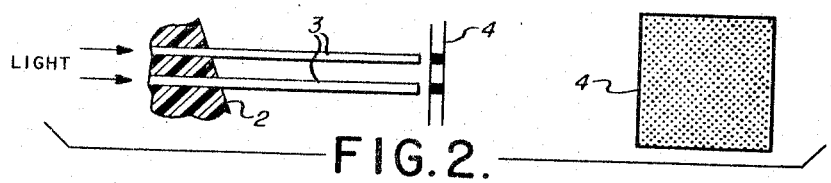
FIGS. 2, 3 and 4 are explanatory of the function of masks of different kinds in a device according to the invention.

FIG. 2 illustrates a static mask 4, that is to say one that is prepared so as to block the passage of light when no input signal is applied to the apparatus.

In this case the apparatus includes an array of parallel fibers 3 of similar overall length embedded near one end in a block 2 of opaque epoxy resin, the fibers 3 being of fused quartz. It is assumed that they are illuminated from the left-hand side as viewed in the drawing. The figure shows diagrammatically two of these fibers 3. A sensitized photographic plate 4 is arranged close to the free ends of the fibers 3, and light is passed through them, without any signal being applied to the apparatus, so as to produce a latent image in the emulsion. This is developed in the usual way to give a negative image, that is to say, one in which those parts that have been exposed to light are opaque. After processing in this way the plate 4 is returned to its original position so that opposite the end of each fiber 3 there is a black dot which obstructs the passage of light except when the fiber 3 is set into vibration. A mask 4 of this kind may be used in combination with other kinds of masks as will be described below. A typical static mask 4 having a plurality of dots corresponding to the number of fibers 3 in the array is shown on the right in FIG. 2.

Figure 3:
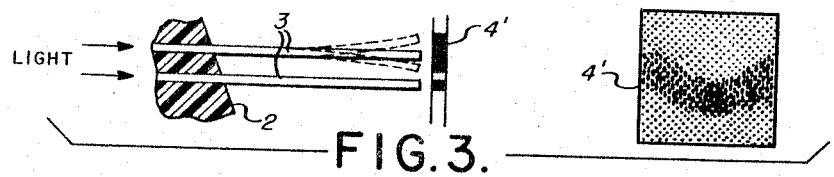

FIG. 3 shows a mask 4' of similar kind, but in this case prepared with a signal applied to set the array of fibers 3 into vibration to provide a rejection mask. Each of the fibers 3 in the array will have its own different resonant frequency, since, apart from any differences in the individual cross-sections of the fibers, they will have different free lengths, being embedded to different depths in for example, a wedge-shaped mounting of rigid material 2. In the condition shown in FIG. 3 it is assumed that the input signal has a component corresponding to the resonant frequency of the upper fiber 3, which is therefore vibrating, but no component of a frequency corresponding to that of the lower fiber 3, which is therefore stationary. The photographic plate 4' is processed to give a negative image and replaced in position.

If a signal is applied to the apparatus which is similar in amplitude and in its frequency spectrum to that with which the mask 4' was prepared, the amplitudes of vibration of the various fibers 3 will be similar to those which occurred during preparation of the mask 4' and the free ends of the fibers 3 will be in juxtaposition to opaque areas of the mask 4', so that little or no light will be transmitted.

If, on the other hand, the signal applied to the apparatus differs in its content at different frequencies from that applied during preparation of the mask 4', the pattern of vibration of the free ends of the fibers 3 will be different, for example it may be imagined that in FIG. 3 the upper fiber 3 is now stationary and the lower one is set in vibration thereby producing an output signal due to light passing on either side of the opaque region opposite the lower fiber 3. This arrangement therefore will provide an output signal when the input differs from that with which the mask 4' is prepared, except for inputs which have fewer spectral components but are otherwise the same as the memory signal. The mask 4' shown to the right in FIG. 3 is a typical rejection mask.

Figure 4:
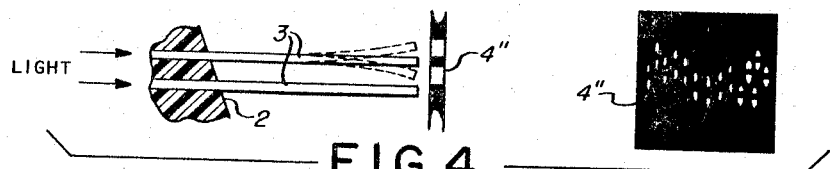

FIG. 4 illustrates an acceptance mask 4'' in this case is prepared by exposing a sensitized photographic plate to light travelling through the fibers 3 the same as for the mask 4' of FIG. 3, but it is now developed by a reversal process so as to give a positive image which is transparent in those regions exposed to light, and opaque elsewhere. Such a mask will pass a maximum amount of light when no signal at all is applied to the apparatus. This mask is therefore combined with a static mask 4 as shown in FIG. 2 which obstructs light in the complete absence of a signal. The acceptance mask 4'', as shown at the right in FIG. 4 will cause the apparatus to give its maximum output signal when the input corresponds to that with which the mask 4'' was prepared and also for a signal having additional spectral components, and a lesser signal for inputs of any other kind.

Masks of the character described above have been made utilizing medium contrast Kodak Lantern Slide Plate and exposing it to incandescent light. This material consists of a blue-sensitive photographic emulsion coated on a .040 inch thick glass slide, the other side of which is covered with an anti-halation backing. It was selected because of the excellent dimensional stability of the emulsion and for the rigidity provided by the glass slide. The exposed slides are developed or processed according to the manufacturer's recommendations in Kodak Versatol developer to provide the best contrast. However, variations in photographic results are possible by using other techniques such as other developers. For example, the gray tone range can be extended by using developers other than that recommended. A diffuser may be used between the light source and the array to diffuse the filament image if desired.

An alternative method that is particularly suitable for making acceptance masks utilizes Kodak Autopositive film available on .050 inch thick glass plate. This film has the charcteristic of being all black if developed without exposure. However, it can be turned transparent by yellow light, and back to black by blue-white light, all before development. As applied to the present invention, the acceptance mask may be made on autopositive film as follows:

(a) Expose mask, with emulsion side towards fibers, in place to array subjected to dynamic signal, with long wave radiation such as yellow light;

(b) Expose mask in place to array for static fiber position, with radiation within the spectral sensitivity of the emulsion such as blue-white light, and (c) Develop mask.

The long wave radiation, for instance, can be obtained from a carbon arc lamp such as Bausch and Lomb type 42–44–65, filtered with Kodak yellow sheeting. This filter material has the characteristic of passing long wave radiation beyond approximately 560 millimicrons. Without the filter, the same lamp may serve as a radiation source within the spectral sensitivity of the emulsion. In both cases, a water cell may be used between the lamp and filter to reduce radiant heat transmitted to the fiber array. The order of steps (a) and (b) may be interchanged and still produce the desired result.

The result is a mask which is all black, with clear tracks where fibers have moved, and with complementary black static spots in the middle of the dynamic tracks. Those fibers which did not move in step (a) or (b) are reversibly cancelled in the two exposures, leaving the mask in its normal black condition. This process maintains perfect alignment of the combined patterns of static and dynamic spots because the mask and light are never moved from their initial positions. This enables perfect cancellation on the mask of those fibers which did not move during the dynamic exposure. This type of film is also characterized by extremely high contrast, with an exposure latitude of only about 3 to 7 times, as compared to 100 for medium contrast lantern slides which produces very sharp images. This limits the tonal graduation possibilities. Further, the exposure ratio between yellow and blue-white is important to provide proper cancellation of stationary fibers without overexposing the static spots. In practice, the (b) exposure is made just long enough to prevent the appearance of halos around stationary fibers. Because of the low speed of the film, the entire process may be carried out in an ambient light level of ten foot candles or less. The spectral characteristics of the light are extremely important in using this film; incandescent light does not contain sufficient blue, and will not properly cancel the static spots. Also, the light should be focussed, or collimated, to avoid color separation by the fibers due to a different index of refraction for each wavelength. A mercury lamp is preferred for this purpose. Development of the exposed autopositive film is in accordance with the manufacturer's instructions.

The steps described immediately above are for a type of mask in which one of the exposures is static. Other special purpose acceptance masks may be made by substituting another signal for the static exposure. For instance, two signals may have a common characteristic which creates difficulty in recognizing these signals from each other. By exposing these signals alternately in the manner previously described, their common characteristic would be cancelled. The output from the mask is then a measure of the difference between these signals. The same technique may be extended to a group of signals, all with a common characteristic, in which it is desired to recognize each of these signals from each other. Every acceptance mask for each signal in the group would be programmed with the common characteristic as the second exposure, instead of a static exposure.

Figure 5:
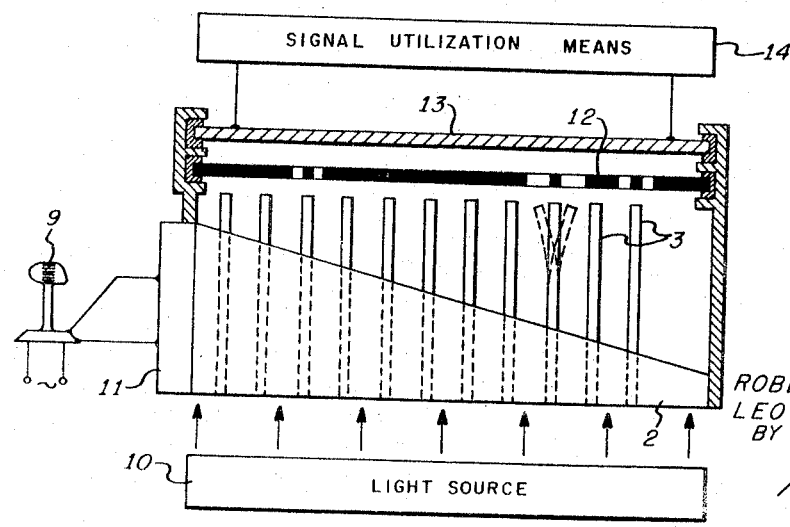
FIG. 5 is a schematic diagram illustrating the principle of operation of a device according to the present invention provided with a composite mask to enable it to respond to a particular input signal.

FIG. 5 shows in diagrammatic form the principle of a device of the kind described above designed to recognize a particular input signal, for example, the output of a microphone 9 into which words are spoken, only one of which corresponds to the particular input signal which results in the desired output signal.

In this case a number of fibers 3 are embedded in a wedge-shaped block 2 of an opaque epoxy resin, their lower ends as viewed in the drawing being flush with one surface of the block 2 and exposed so that light from the light source 10 can enter.

Attached to one side of the block 2 is a plate 11 of piezo-electric crystalline material provided with electrical leads that connect to the microphone 9. The plate 11 has a natural frequency of vibration considerably higher than those to which the fibers 3 respond. The fibers 3 project for different lengths from the block 2, and therefore all have different resonant frequencies.

Close to the free ends of the fibers 3 there is arranged an acceptance mask 12 consisting of a static mask designed to block light emerging from the ends of the fibers 3 when no signal is being received and a positive mask prepared as described with respect to FIG. 4 (or utilizing autopositive film) while a particular sound was being fed into the microphone 9 and providing an electric signal to the plate 11 thereby vibrating the block 2 and the fibers 3. During the application of this signal certain of its frequency components will correspond to the resonant frequencies of certain of the fibers 3 and will cause them to be set into vibration at different amplitudes producing in the mask 12 translucent areas corresponding to the fibers 3 so excited. As shown in FIG. 5, such areas occur opposite the third, ninth and eleventh fibers 3 reading from left to right. Behind the acceptance mask 12 is a photocell 13 of photoconductive material which sums the total light transmitted by the fibers 3 through the mask 12 and conducts a corresponding output signal to signal utilization means 14.

When a signal from the microphone 9 is applied to the plate 11, it sets the fibers 3 into vibration. If the signal corresponds to that with which the acceptance mask 12 was prepared, the amount of light reaching the photocell 13 will be a maximum and a relatively large output signal will be produced. Any different input will set different fibers 3 into oscillation and only a very much smaller output signal will result, unless these inputs completely overlap the frequency components stored in the mask.

If a device having a low input impedance is required, the piezo-electric plate 11 may be replaced by an electromagnetic transducer, for example a moving-coil transducer.

Figure 6:
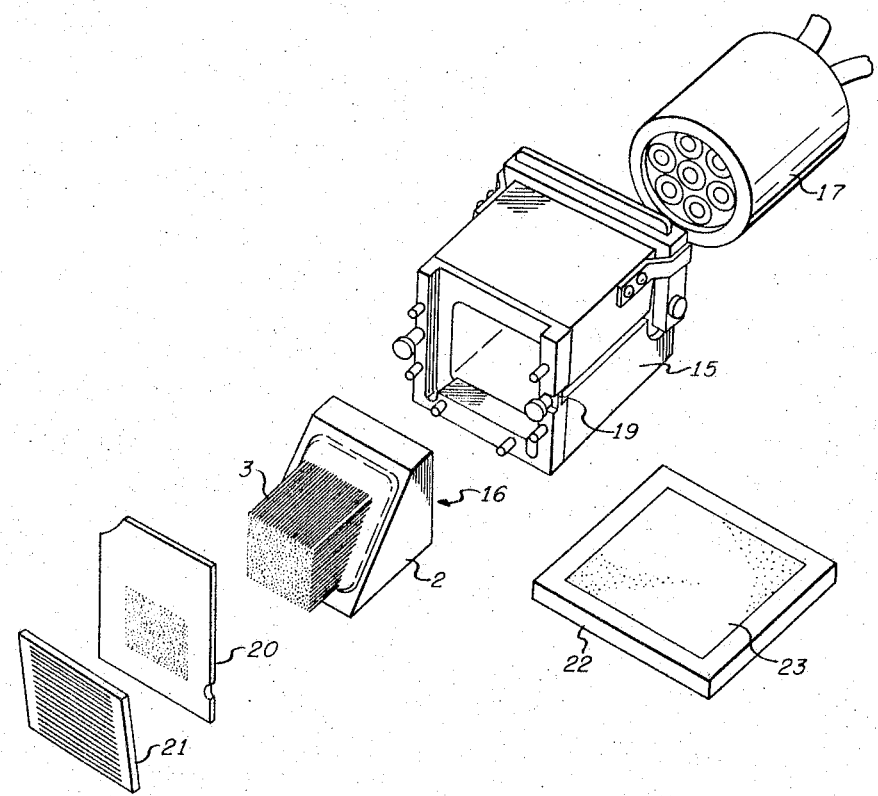
FIG. 6 shows diagrammatically an exploded view of the components of a device of the kind represented in FIG. 5.

FIG. 6 shows in an exploded view, the essential components of a successfully tested device of the kind shown in FIG. 5. The device comprises a light source 17 which may consist of a number of small bulbs arranged to be supplied with current and disposed so as to produce even illumination on the base of the assembly of fibers 3. A housing 15 is arranged to receive the fiber assembly 16, which consists, as before, of fibers 3 of fused quartz, for example, embedded in a wedge-shaped block 2 of opaque epoxy resin so that one set of end faces is exposed at the rear of the block 2 (not visible in the drawing) to the light source 14. The housing 15 has, on its front face, means 19 for mounting a photographically-produced mask 20 close to the free ends of the fibers 3 in order that after removal the mask 20 can be re-inserted accurately in the same position. Beyond the mask 20 is mounted a plate 21 of photoconductive material provided with electrodes, which forms the photocell of the apparatus. A plate 22, in this case of piezo-ceramic material with evaporated metal electrodes 23 on its opposite surfaces, is clamped against one side of the housing 15. The manner of operation of this device is as previously described with reference to FIG. 5.

For more effective recognition, it is required that a signal or signal category be defined by two masks, i.e. either the rejection mask and the static mask, or the rejection mask and the acceptance mask. The combination to be employed depends upon the application. There are several reasons for the two mask requirement.

The primary reason lies in the theory of pattern recognition. The response of the system must be a measure of the similarity of the received signal to the stored signal. If a single mask is used, either accept or reject, information is lost behind the opaque area of the mask. Neither mask alone will indicate whether or not the received signal is identical to the stored signal. In the event that the received signal is not identical to the stored signal, neither mask will define similarity. An accurate evaluation of similarity is obtained by using the acceptance and rejection masks in combination and detecting the difference of the two. Information hidden behind the opaque area of one mask is passed by the other. This is also true of the reject-static mask combination. However, the acceptance mask discriminates against signals other than the stored signal (the static mask does not) and thus provides precise signal definition.

The advantage of using the rejection and static masks in combination is that a degree of gain control or normalization can be achieved. The combination reject-accept mask is very amplitude sensitive. Recognition potential is degraded rapidly when signals are received at amplitudes greater than that at which the masks were made. This is not true with the rejection-static mask combination. When the signal for which the unit was programmed is received, the rejection mask passes a minimum of light and the static mask passes a certain level of light. If signal amplitude is increased, light will pass the rejection mask but the output of the static unit will also increase in like manner, maintaining the output ratio to be detected at essentially the same level.

Thus, for situations where reasonable amplitude control can be expected and where a precise signal definition is required, the acceptance-rejection mask combination may be employed. Where significant amplitude variation on incoming signals is anticipated and little gain control can be maintained, the rejectance-static mask combination generally has been found to be satisfactory.

Figure 7:
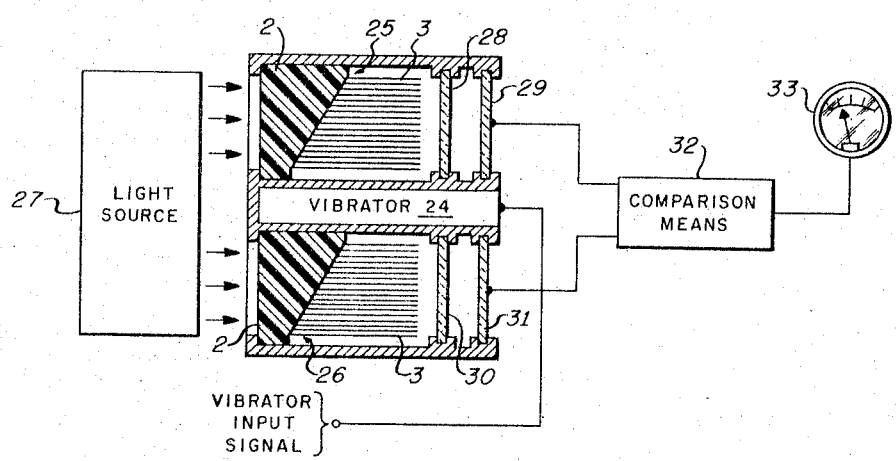
FIG. 7 is a simplified schematic diagram indicating the manner of using a plurality of cooperative masks and signal detectors for providing a resultant signal.

FIG. 7 shows diagrammatically an arrangement using a pair of cooperative masks for signal recognition in accordance with the above theory. In this case, a common vibrator 24 is arranged to set into vibration the fibers 3 of two assemblies 25 and 26 of the type generally described with reference to FIG. 6 in accordance with the input signal to the vibrator 24. A common light source 27 provides illumination for the assemblies 25 and 26 which are identical. The assembly 25 has a rejection mask 28, for example, disposed between the fibers 3 and the photocell 29 while the assembly 26 has a static mask 30, for example, disposed between its fibers 3 and the photocell 31. The photocells 29 and 31 are connected to a comparison means 32 which in turn is connected to a signal utilization means 33 shown in the form of an indicator. When a signal for which the system of FIG. 7 was programmed is received, the fibers 3 of the assemblies 25 and 26 vibrate in the manner described above in order that the rejection mask 28 passes a minimum of light and the static mask 30 passes a certain level of light thereby providing a certain output signal from the comparison means 32.

The comparison means 32 may take the form of a conventional Wheatstone bridge network with the photocells 29 and 31 connected in two arms thereof to provide an output signal that is representative of the difference of the two photocell signals. Alternatively, the comparison means 32 may be a conventional algebraic summation circuit for providing an output representative of the ratio of the two photocell signals.

Color film is also adaptable for use in making masks of the character described above. Conventional color film has three separate emulsion layers in intimate contact. Each layer responds to one of the primary colors (i.e. red, yellow or blue). These emulsions are actually the usual black and white type of silver halide crystals with the color in the film being introduced in the processing of the film when various dyes saturate the unexposed regions of the film.

These characteristics of color film offer many advantages for use as masks. For example, in using the Lantern slide plates, to physically add three masks would result in an excessively thick combination and would introduce many optical problems because of the several glass layers. Registration of the separate masks would also be a problem. However, with color film the thickness is not much greater than a single slide and the mutual registration problem does not exist due to the fixed position of the three layers.

This type of film can be used either processed as black and white or processed as color film. The three emulsion layers can be utilized for many combinations, for example:

(1) The first layer may be a static mask, the second an acceptance mask for a particular signal, and the third a rejection mask for a signal which is overly similar to the desired signal and against which it is desired to discriminate. This may be done either in color or in black and white.

(2) Using the color process, two signals may be introduced by using different color lights. The colors may be so selected that the addition of the two constitutes either a rejection or acceptance mask. Thus, the common characteristics of the two signals can be either eliminated or enhanced, according to the plan being followed.

(3) Several signals can be programmed onto one mask by using different colored lights. This is possible if the signals are distinct enough so that each excites different groups of fibers. Each assembly may then be capable of detecting several separate signals. This multiple memory reduces the total number of assembly units required for recognition of a given number of signals.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. The method of producing a recording of a pattern representative of a multifrequency signal from an array of energy transmitting fibers so supported by a block that they have different resonant frequencies consisting of the steps of:

(a) masking with removable masking means a device for receiving energy transmitted from said fibers to prevent energy from being received by said device, (b) positioning said masked device so that energy could pass from said fibers to said device were said device not masked, (c) exposing said masking means to energy transmitted from said fibers when said fibers are at rest to adapt parts of said masking means to produce a recording accordingly, (d) vibrating said block in accordance with said multifrequency signal to set certain fibers in motion, whereby said certain fibers in bending adapt parts of said masking means to produce a recording of a pattern representative of said multifrequency signal, and (e) producing a recording on said masking means representative of the energy transmitted from said fibers when at rest and when vibrated in accordance with said multifrequency signal.

2. The method of producing photographically a recording of a pattern representative of a multifrequency signal from an array of energy transmitting fibers so supported by a block that they have different resonant frequencies including the steps of:
   (a) exposing a light sensitive film to light transmitted from said fibers when said fibers are at rest,
   (b) vibrating said block in accordance with said multifrequency signal to set certain fibers in motion,
   (c) exposing said film to light transmitted from said certain fibers while in motion to expose said film to said pattern, and
   (d) photographically developing said film to provide a superimposed record of said exposures.

3. The method of producing photographically a recording of a plurality of patterns from an array of light transmitting fibers so supported by a block that said fibers have different resonant frequencies, at least one of said patterns being representative of a desired signal including the steps of:
   (a) exposing a light sensitive film to light transmitted from said fibers when said fibers are in a first condition to provide a first pattern,
   (b) exposing said film to light transmitted from said fibers when said fibers are in a second condition to provide a second snuperimposed pattern representative of said desired signal, and
   (c) photographically developing said film to provide a superimposed record of said patterns.

4. The method of producing a recording of a plurality of patterns from an array of radiation transmitting fibers so supported that said fibers have different resonant frequencies, at least one of said patterns being representative of a desired signal including the steps of:
   (a) exposing radiation sensitive film to a first radiation transmitted from said fibers, when said fibers are in a first condition to provide a first pattern,
   (b) exposing said film to a second radiation transmitted from said fibers when said fibers are in a second condition to provide a second pattern, and
   (c) processing said film to provide a record of said patterns.

5. The method of producing on a radiation sensitive film a recording of a plurality of patterns from an array of radiation transmitting fibers so supported that said fibers have different resonant frequencies, at least one of said patterns being representative of a desired signal including the steps of:
   (a) exposing said radiation sensitive film to a first radiation transmitted from said fibers when said fibers are in a first condition to provide a first pattern,
   (b) exposing said film to a second radiation transmitted from said fibers when said fibers are in a second condition to provide a second pattern, and
   (c) processing said film to provide a complementary record of said patterns.

6. The method of producing on a radiation sensitive film a recording of a plurality of patterns from an array of radiation transmitting fibers so supported that said fibers have different resonant frequencies, at least one of said patterns being representative of a desired signal including the steps of:
   (a) exposing said radiation sensitive film to a first radiation outside the spectral sensitivity of said film transmitted from said fibers when said fibers are in a first condition to provide a first pattern,
   (b) exposing said film to a second radiation within the spectral sensitivity of said film transmitted from said fibers when said fibers are in a second condition to provide a second pattern, and
   (c) processing said film to provide a complementary record of said patterns.

7. The method of producing on a single layer of a radiation sensitive film a recording of a combination of positive and negative images corresponding to a plurality of patterns from an array of radiation transmitting fibers so supported that said fibers have different resonant frequencies, at least one of said patterns being representative of a desired signal including the steps of:
   (a) exposing said radiation sensitive film to a first radiation transmitted from said fibers when said fibers are in a first condition to provide a first pattern,
   (b) exposing said film to a second radiation transmitted from said fibers when said fibers are in a second condition to provide a second pattern representative of said desired signal, and
   (c) processing said film to provide a complementary record of said patterns.

8. The method of producing on a single emulsion layer of a radiation sensitive film a recording of a combination of positive and negative images corresponding to a plurality of patterns from an array of radiation transmitting fibers so supported that said fibers have different resonant frequencies, at least one of said patterns being representative of a desired signal including the steps of:
   (a) exposing said radiation sensitive film to a first radiation transmitted from said fibers when said fibers are in a first condition to provide a positive image of a first pattern,
   (b) exposing said film to a second radiation transmitted from said fibers when said fibers are in a second condition to provide a negative image of a second pattern representative of said desired signal, and
   (c) photographically developing said film to provide a complementary record of said patterns.

References Cited by the Examiner

UNITED STATES PATENTS
2,951,736   9/1960   Black _____ 346—1

FOREIGN PATENTS
467,609   6/1937   Great Britain.

RICHARD B. WILKINSON, *Primary Examiner.*

J. W. HARTARY, *Assistant Examiner.*